UNITED STATES PATENT OFFICE.

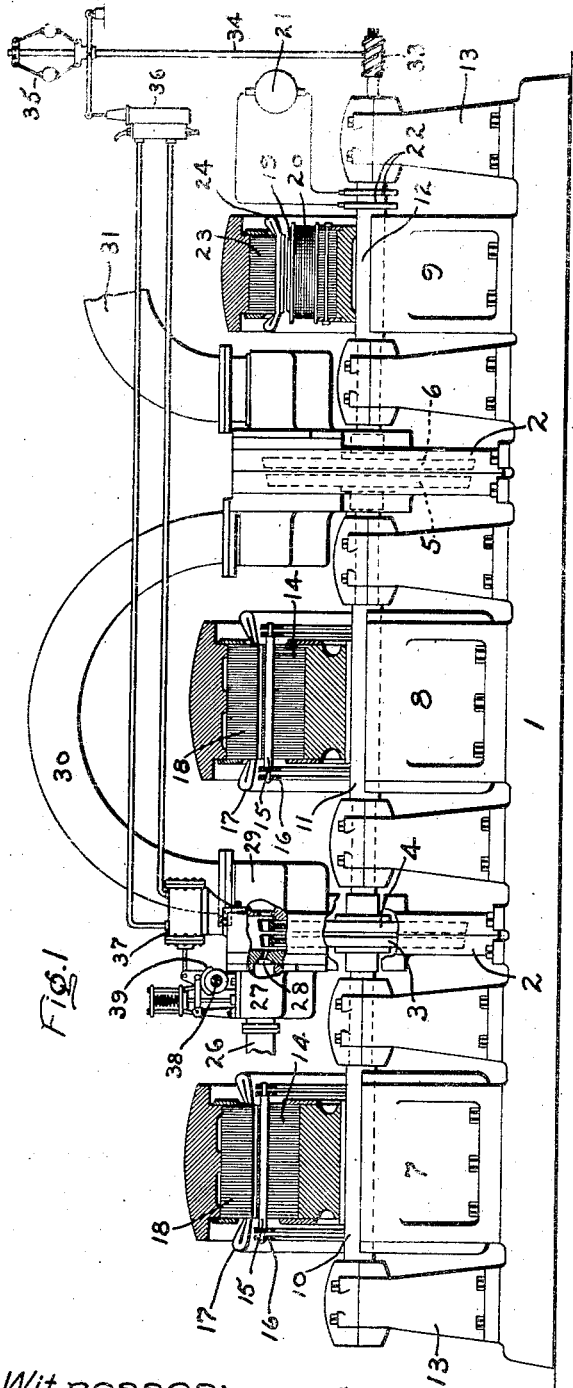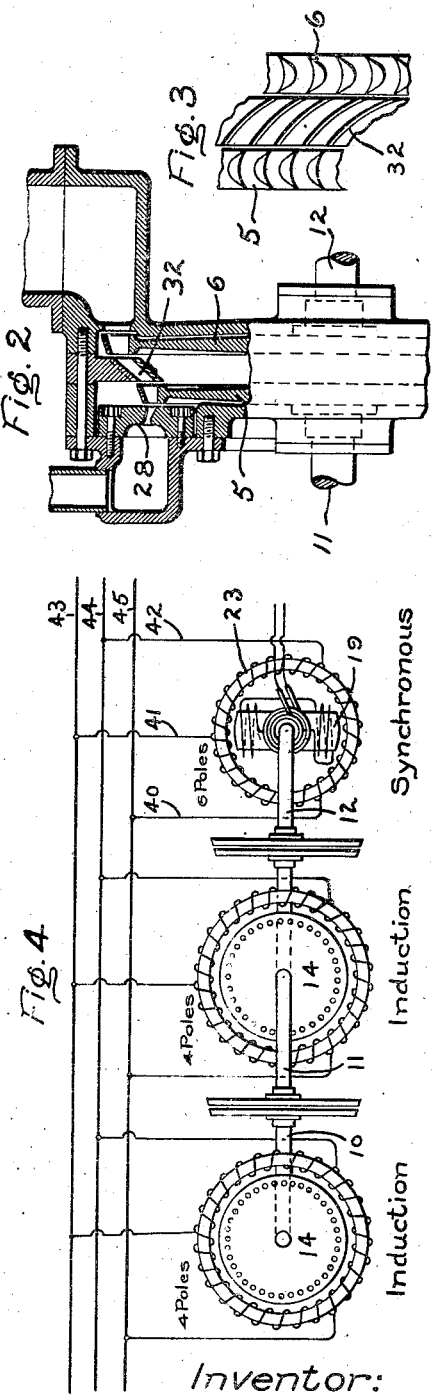

ERNST J. BERG, OF SCHENECTADY, NEW YORK, ASSIGNOR TO GENERAL ELECTRIC COMPANY, A CORPORATION OF NEW YORK

TURBO-GENERATOR.

No. 910,165.  Specification of Letters Patent.  Patented Jan. 19, 1909.

Application filed September 7, 1907. Serial No. 391,754.

*To all whom it may concern:*

Be it known that I, ERNST J. BERG, a citizen of the United States, residing at Schenectady, county of Schenectady, State of New York, have invented certain new and useful Improvements in Turbo-Generators, of which the following is a specification.

The present invention relates to turbo-generators driven by multi-stage turbines wherein each stage is provided with independently and usually with oppositely rotating wheels, and has for its object to improve their construction and operation.

In carrying out my invention the turbine is divided into two stages each containing independently rotating bucket wheels. The adjacent wheels of the two stages are mounted on the same shaft, while the two outer wheels have individual shafts. The steam flows in any suitable manner as in series through the admission nozzles and wheels of both stages. In order to preserve the speed relation of the shafts and to effectively utilize the power developed by the turbines, three electric generators wound for the same voltage are employed, the rotating members of which are driven by the shafts. To obtain the highest efficiency in operation, such turbines should run at very high speeds. The electric generator best suited for such purposes is of the induction type having a squirrel cage rotor and a field winding excited by alternating current. The rotor of such a machine can be rotated, practically speaking, at any desired high speed. This type of machine is not self exciting and does not set its own frequency but requires current from an alternating current source of supply for the purpose. A synchronous alternator, on the other hand, for mechanical reasons is not adapted to operate at such high speeds but has the advantage of generating a current of definite frequency for a given speed and number of poles and requires only a direct current exciter. The alternating current derived from this machine may be employed to excite the field winding of the squirrel cage alternators and also to supply current to multi-phase line conductors. The direct current exciter for the field winding may be driven by the turbine shaft or a separate source may be utilized if desired.

Since the synchronous alternator is limited as to its speed I arrange the turbine wheel that is connected to its rotor to have a lower shaft speed than the rotors of the squirrel cage machines. The latter machines are wound for a given number of poles, say four for example, while the synchronous machine is wound with a greater number of poles say six for example. A governor is or may be provided to regulate the speed of the synchronous machine, for example to keep it at substantially 500 R. P. M. This machine will then have a frequency of 1500 per minute as will also the squirrel cage machines which are connected thereto. Since the latter machines have only four poles it follows that the shaft speed will be higher than that of the synchronous machine or 750 R. P. M. at no load and very slightly higher with load. These figures are given as illustration of my invention and not as limitations because other speeds can be employed if occasion demands. In general it may be stated that the induction machines will run faster than the synchronous machine, all being connected to the same circuit, and the speed relation will vary from the above ratio by an amount determined by the $I^2$ (armature copper) loss in the armature of the induction machine. Under full load conditions this variation may amount to about 1%.

The diameters of the opposed wheels, one of which drives the rotor of the synchronous alternator, may be of the same or substantially the same size, or the bucket wheel connected to said rotor may be considerably larger in which case the extraction power of the buckets is greater and the steam economy improved, assuming that the volume of steam to be handled is not so great as to impose limitations on the safe design of the bucket wheel. Where bucket wheels differing greatly in diameter are employed, intermediate buckets or passages are provided which receive the steam exhausting from the wheel of smaller diameter and convey it to the larger. In this case as before the wheels will rotate in opposite directions since the intermediates do not reverse the motive fluid but serve to direct it at the best angle of entrance.

It will be seen that the generators while revolving at the different speeds best suited to their construction have the same frequency and in addition to being electrically geared together, so to speak, furnish current to the same bus-bars or other conductors for supplying current to translating devices.

The steam flows through the four bucket wheels in series, the first wheel driving one rotor, the second and third driving another through the same shaft, and the fourth wheel driving the third rotor.

In the accompanying drawing which illustrates one of the embodiments of my invention, Figure 1 is a side elevation partly in section of a multi-stage turbine directly connected to three electric generators; Fig. 2 is an enlarged detail view showing intermediates for conveying steam from one wheel to the next; Fig. 3 is a detail view showing the intermediate and wheel buckets in plan view; and Fig. 4 is a diagrammatic view illustrating the connections of the generators.

1 indicates the base of the machine, and mounted thereon are casings 2, each containing a pair of bucket wheels 3, 4 and 5, 6. Generators 7, 8 and 9 are also mounted on the base, and their rotors are carried by shafts 10, 11 and 12. Each shaft is provided with suitable bearings for supporting it. The bearings are carried by pedestals 13 resting on the base. The rotors of generators 7 and 8 are built up of laminated iron 14 with conductors 15 embedded therein and connected by end rings 16 to form a squirrel cage winding. The same winding 17 suffices for both armature and field and is supported in a laminated structure 18. The construction of the synchronous generator 9 is different in that it is provided with a rotating structure having field poles 19 provided with coils 20. These coils receive current from the exciter 21 through the intermediary of brushes and slip-rings 22. The armature comprises a laminated stationary structure 23 having a winding 24.

The rotor of the generator 7 is driven by the bucket wheel 3. The rotor of the generator 8 is driven by the bucket wheels 4 and 5, and the rotor of the generator 9 is driven by the bucket wheel 6. Steam is admitted to the turbine by the conduit 26 which communicates with a steam chest 27 and supplies steam to the sectionalized nozzle 28. The steam after it escapes from the bucket wheel 4 enters a hood 29 formed at the side of the casing and is conveyed by the pipe 30 to the second or low-pressure stage of the machine. After flowing through this stage it escapes by the exhaust conduit 31 to a condenser or to the atmosphere, as desired. As shown, the steam flows through all of the wheels in series from left to right, but if it be desired to change the output of any given wheel it can be done by modifying the passage of the steam.

In Fig. 2 the nozzles 28 are shown on a somewhat larger scale as are also the bucket wheels 5 and 6. It will be observed that the bucket wheel 6 is considerably larger in diameter than the wheel 5, therefore, it has a higher bucket speed, but owing to the fact that its shaft 12 is electrically geared or tied to the other shafts by the synchronous and induction alternators the shaft speed is lower than that of the shafts 10 and 11. In order to convey steam from one wheel to the other, intermediate buckets or passages 32 are provided which are carried by the casing of the machine and are supported in any suitable manner. The relation of these buckets to the wheel buckets is clearly shown in Fig. 3.

Since the synchronous generator 9 determines the frequency of all of the current produced by the machine as a whole it is necessary to govern its speed. To carry out this feature a worm 33 is mounted on the end of the shaft 12 and meshing therewith is a worm wheel mounted on the end of the low speed shaft 34. On the upper end of the shaft is a centrifugal governor 35 which controls the action of a pilot valve 36. The pilot valve in turn controls a hydraulic motor 37, the piston of which moves a rock shaft 38 to-and-fro. The rock shaft is provided with cams 39, each of which actuates a valve for cutting nozzle sections into and out of service. The governing mechanism is shown in a more or less diagrammatic manner to enable the features to be more readily understood. It is evident, however, that other forms of mechanism can be employed without departing from my invention.

As the load changes the hydraulic motor will move the cam shaft in a manner to change the number of nozzles in service and hence the total admission of steam. Since the speed governor is driven by the shaft of the synchronous machine the speed of the latter will be the determining factor in regulating the steam flow.

Referring to Fig. 4, I have shown the generators and their circuits in diagram for the purpose of illustration. 14 indicates the rotating structure of the squirrel cage or induction alternators and 19 the field poles of the synchronous alternator. The former have four and the latter has six field poles. The armature structure 23 of the synchronous alternator is connected by a three-phase connection 40, 41 and 42 with the bus-bars or conductors 43, 44 and 45. The field and armature windings of the squirrel cage machines are wound to produce four field poles and the said bus-bars are connected to said windings in a manner to cause the field to rotate at such a speed as will insure the same frequency in the current produced in said machines as in the synchronous alternator. In addition to carrying current for fixing the frequency of the induction machines and for maintaining the proper speed relation of the three machines, the conductors of bus-bars 43, 44 and 45 may supply current for any desired purpose. It is to be noted that the same windings on the induction machines serve to excite them and also to generate current and supply it to the bus-bars or conductors in a manner well understood in the electrical art.

In accordance with the provisions of the patent statutes, I have described the principle of operation of my invention, together with the apparatus which I now consider to represent the best embodiment thereof, but I desire to have it understood that the apparatus shown is only illustrative, and that the invention can be carried out by other means.

What I claim as new and desire to secure by Letters Patent of the United States, is,—

1. In a turbo-generator, the combination of an elastic fluid turbine comprising bucket wheels, a shaft driven at relatively high speed by one of the wheels, an induction alternator on said shaft, a second shaft driven at lower speed by another of said wheels, and a synchronous generator on said second shaft.

2. In a turbo-generator, the combination of an elastic fluid turbine comprising independently rotating bucket wheels, a shaft driven at relatively high speed by one of the wheels, an induction alternator on said shaft, a second shaft driven at lower speed by a wheel, a synchronous alternator on said second shaft, means for maintaining an approximately constant speed relation between the shafts, and a governor controlling the flow of motive fluid which is responsive to changes in the speed of the second shaft.

3. In a turbo-generator, the combination of an elastic fluid turbine comprising independent bucket wheels rotating at different speeds, an induction alternator driven by the wheel having the highest speed, a synchronous alternator driven by the wheel having the lowest speed, and means which maintains the speed relation between the shafts approximately constant.

4. In a turbo-generator, the combination of an elastic fluid turbine comprising bucket wheels, a shaft driven by one of the wheels at a relatively high speed, a second shaft driven by more than one wheel also at a relatively high speed, induction alternators on said shafts, a third shaft driven by one wheel, a synchronous alternator on said third shaft, and means which maintains an approximately constant speed relation between the shafts.

5. In a turbo-generator, the combination of an elastic fluid turbine comprising bucket wheels, a shaft driven at relatively high speed by one of the wheels, a second shaft also driven at relatively high speed, induction alternators on said shafts, a third shaft driven by a wheel, a synchronous alternator on said third shaft, and connections between the alternators which maintain an approximately constant speed relation between them.

6. In a turbo-generator, the combination of an elastic fluid turbine comprising independently rotating bucket wheels, a shaft driven at relatively high speed by one of the wheels, an induction alternator on said shaft, a second shaft also driven at relatively high speed by others of said wheels, an induction alternator on said second shaft, a third shaft driven at lower speed by a wheel, a synchronous alternator on said third shaft, means which maintains a predetermined speed relation between the shafts, conduits causing the motive fluid to flow through the bucket wheels in series, and a governor controlling the flow which is responsive to changes in the speed of the third shaft.

7. In a turbo-generator, the combination of an elastic fluid turbine comprising independently rotating bucket wheels, and conduits for supplying motive fluid thereto, an induction generator driven at relatively high speed by one wheel, a synchronous generator driven at a lower speed by another, and electrical connections between the generators for maintaining an approximately constant speed relation between the shafts.

8. In a turbo-generator, the combination of an elastic fluid turbine comprising independently rotating bucket wheels, and conduits for supplying motive fluid thereto, an induction generator having a certain number of poles driven at relatively high speed by one wheel, a synchronous generator having a greater number of poles driven at a lower speed by another wheel, and connections between the generators for preserving an approximately definite speed relation between them.

9. In a turbo-generator, the combination of an elastic fluid turbine comprising independently rotating bucket wheels, and a fluid supplying conduit, with induction and synchronous alternating current generators driven by said wheels at different speeds, the induction alternator being driven at a higher speed and having a lesser number of field poles than the synchronous alternator, and connections between the alternators for exciting the induction alternator and for preserving an approximately constant speed relation between the shafts.

10. In a turbo-generator, the combination of an elastic fluid turbine, comprising bucket wheels arranged in groups, a casing for each group, conduits for supplying motive fluid to the wheels, shafts connected to and driven by the outer wheels of each group, another shaft connected to and driven by the inner wheels of each group, an electric generator driven by the last mentioned shaft, other generators each driven by one of the first mentioned shafts, one of said last named generators having a greater number of field poles than the other, and electrical connections between the generators, one of the shafts having a different speed from the other shafts and the generators having the same frequency.

11. In combination, an elastic fluid turbine comprising bucket wheels arranged for stage operation, one of said wheels having a higher bucket speed and a lower shaft speed than the others, a synchronous alternator driven by said wheel, induction alternators driven by the other wheels, conduits admitting motive fluid to the several wheels and exhausting it therefrom, and a common conducting line to which the generators are connected.

12. In a turbo-generator, the combination of an elastic fluid turbine comprising bucket wheels one of which is larger in diameter than another and has a greater bucket and lower shaft speed, a synchronous generator driven by said wheel, an induction generator driven by the other wheel, independent rotatable shafts for the wheels, passages receiving fluid from the wheel of smaller diameter and conveying it to the one of larger diameter, and means connecting the generators in parallel to a common line.

13. In combination, an elastic fluid turbine comprising bucket wheels mounted side by side, one having greater bucket and lower shaft speed than the other, a synchronous alternator driven by said wheel, an induction alternator driven by the other wheel, the synchronous alternator having a larger number of poles than the induction alternator, and means connecting the alternators in parallel to a common line.

14. In a turbo-generator, the combination of an elastic fluid turbine comprising bucket wheels, alternating current electric generators driven thereby, one of which determines the frequency of the current generated, conductors to which the generators are connected, and a governing mechanism regulating the passage of motive fluid through the bucket wheels that is responsive to the speed of the shaft of the generator which determines the frequency.

15. In a turbo-generator, the combination of an elastic fluid turbine comprising bucket wheels, an induction alternating current generator driven by one of the wheels, a synchronous alternating current generator driven by another wheel which determines the frequency of the current produced by the action of both machines, and a governing mechanism which regulates the passage of motive fluid to the wheels that is responsive to the speed of the shaft of the synchronous generator.

16. In a turbo-generator, the combination of an elastic fluid turbine comprising bucket wheels arranged in groups in separate stage compartments, shafts therefor, an induction generator driven by one of the shafts, a second induction generator driven by a shaft whose bucket wheels are located in different stages, a synchronous generator driven by one of the shafts, electrical connections uniting the generators, and a governing mechanism for the turbine which is responsive to speed changes of the shaft of the synchronous generator.

17. A turbo-generator comprising an elastic fluid turbine having axially-alined and oppositely-rotating bucket wheels arranged in parallel groups, a shaft driven by the inner wheels of two adjacent groups, an induction alternator on said shaft, a second shaft driven by one of the outer wheels of the parallel groups, an induction alternator on the second shaft, a third shaft driven by the other outer wheel of said groups, a synchronous alternator on the third shaft which has a larger number of poles than the induction alternators and rotates at a correspondingly lower speed, electrical connections uniting the alternators, means supplying motive fluid to the turbine, and a governor responsive to changes in the speed of the third shaft which regulates the supply of motive fluid.

In witness whereof, I have hereunto set my hand this 6th day of September, 1907.

ERNST J. BERG.

Witnesses:
BENJAMIN B. HULL,
GRACE HARRIGAN.